(No Model.)　　　　　　　　　　　　　　　5 Sheets—Sheet 1.
R. N. ROSS.
BRICK MACHINE.
No. 550,195.　　　　　　　　　　Patented Nov. 19, 1895.
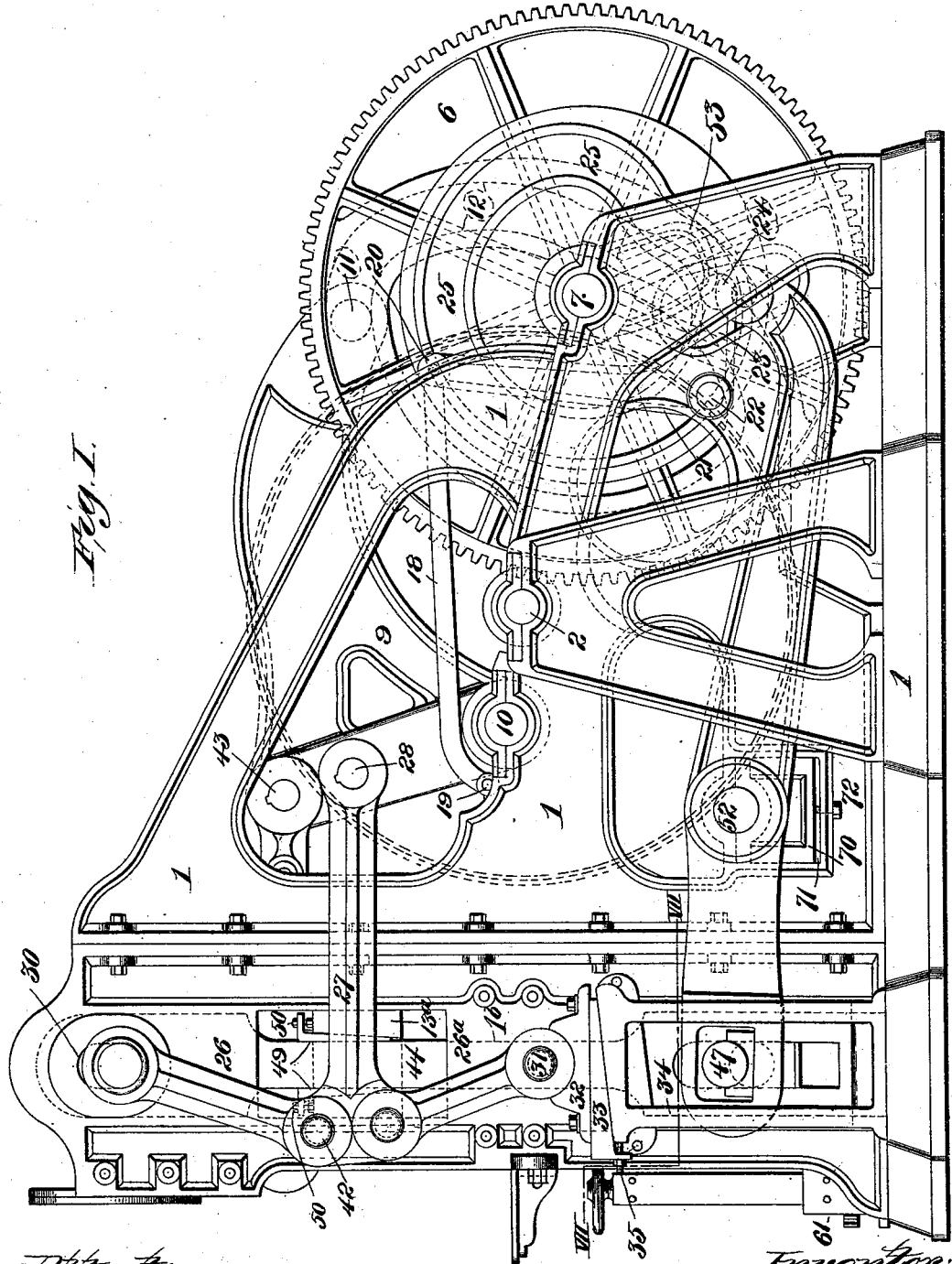
Fig. I.
Attest:　　　　　　　　　　　　　　Inventor:
Wm H Scott　　　　　　　　　　　Robt. N. Ross.
N. Finley　　　　　　　　　　　By Knight Bro
　　　　　　　　　　　　　　　　　　Attys

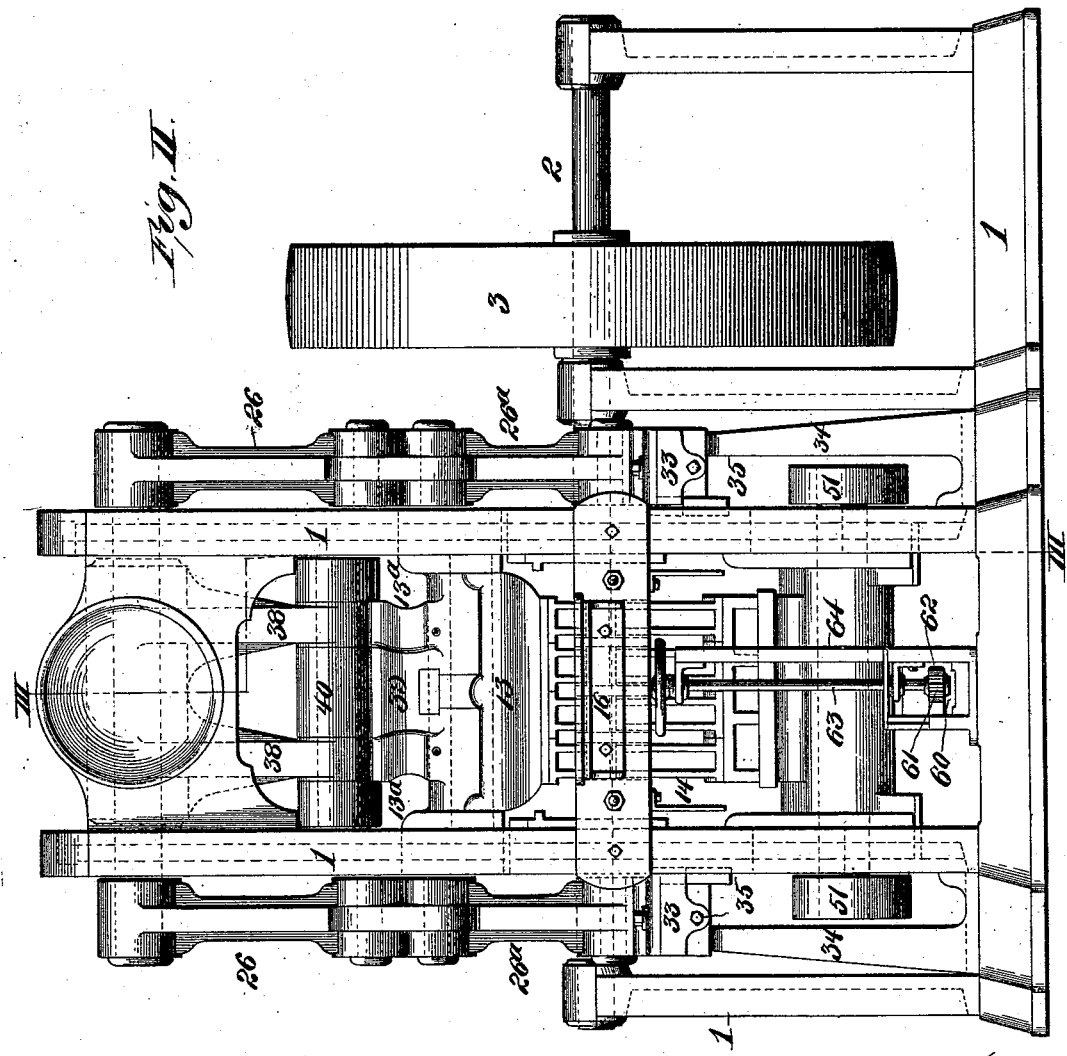

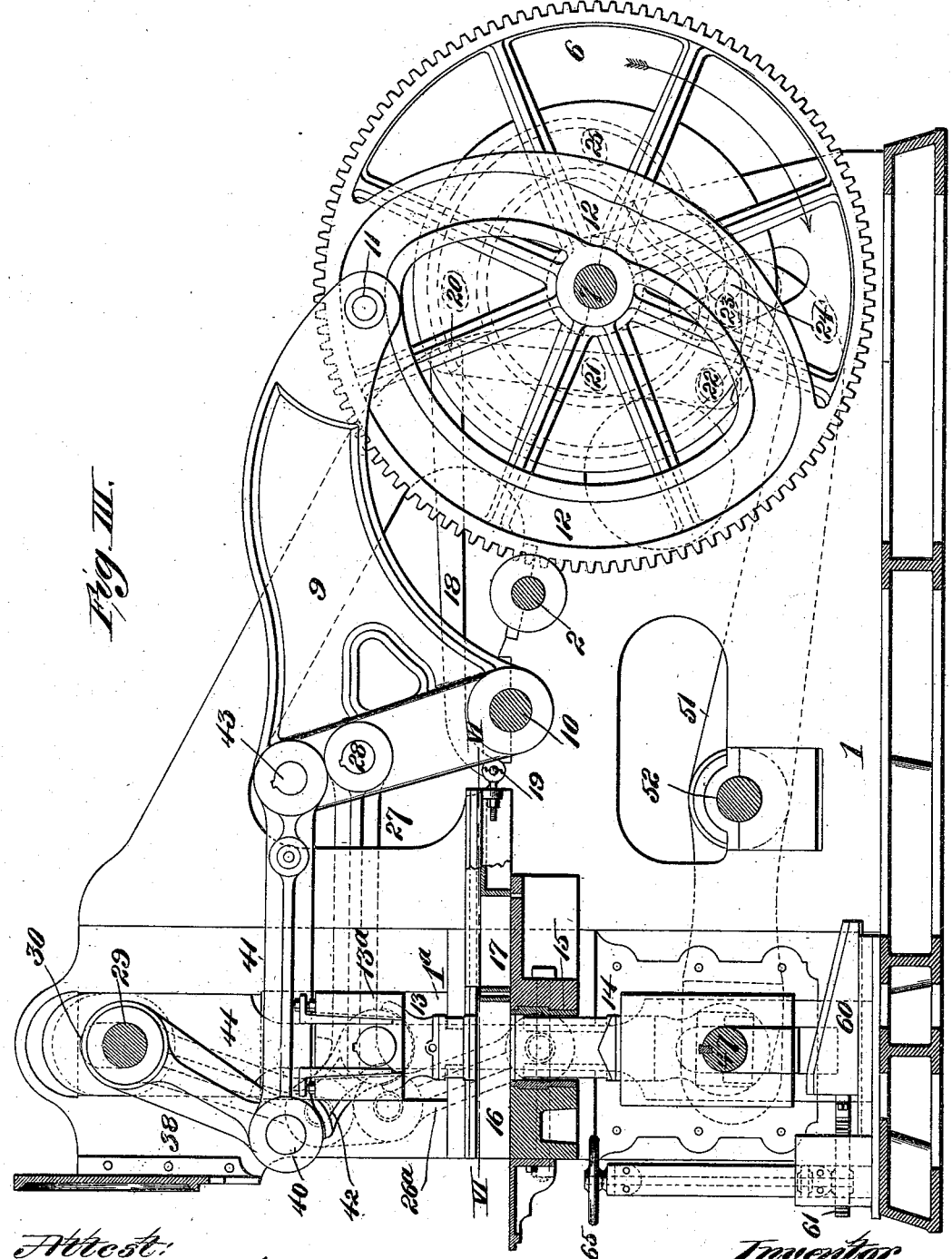

(No Model.)
R. N. ROSS.
BRICK MACHINE.
No. 550,195. Patented Nov. 19, 1895.
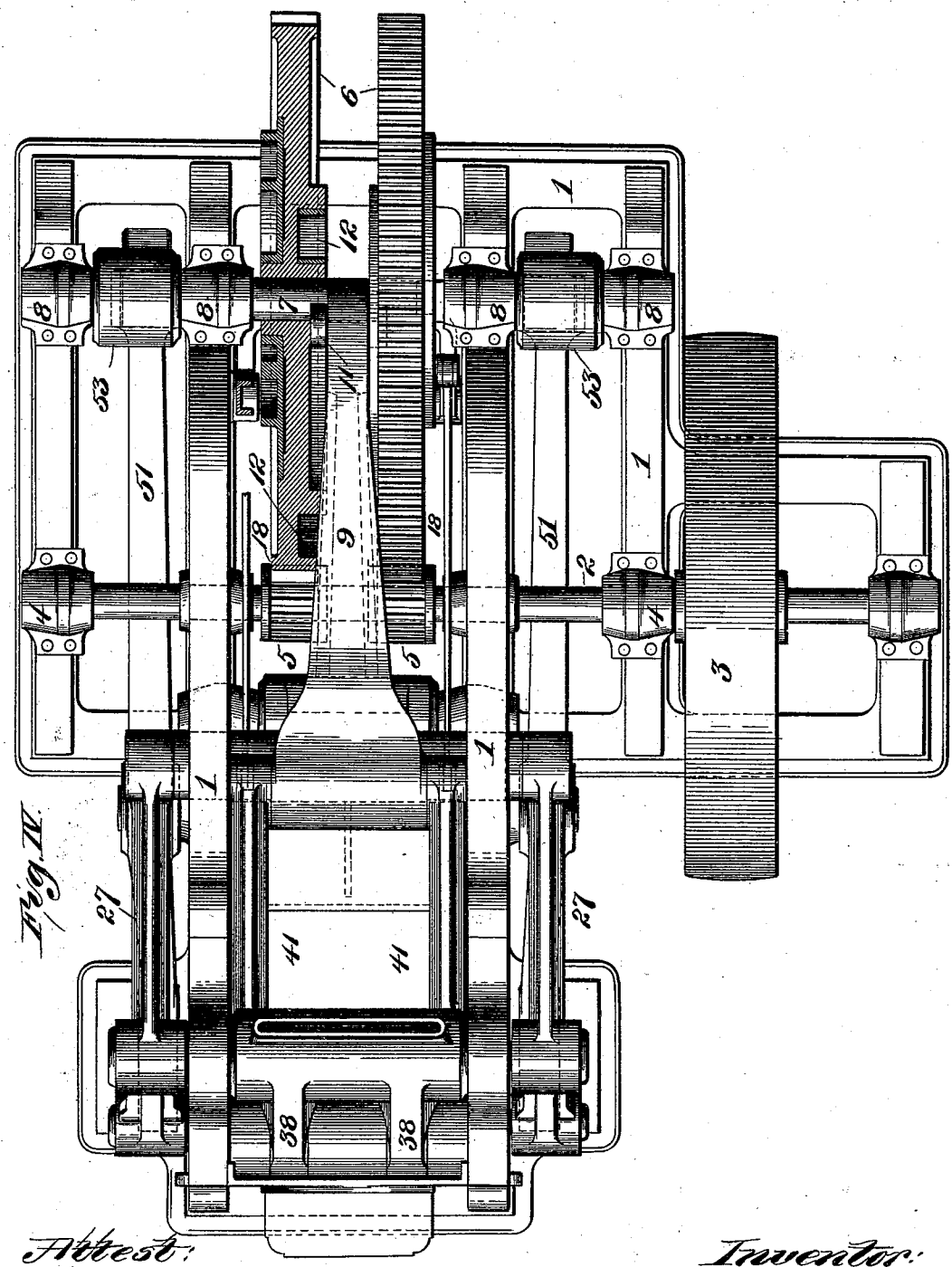

(No Model.) 5 Sheets—Sheet 5.
R. N. ROSS.
BRICK MACHINE.
No. 550,195. Patented Nov. 19, 1895.
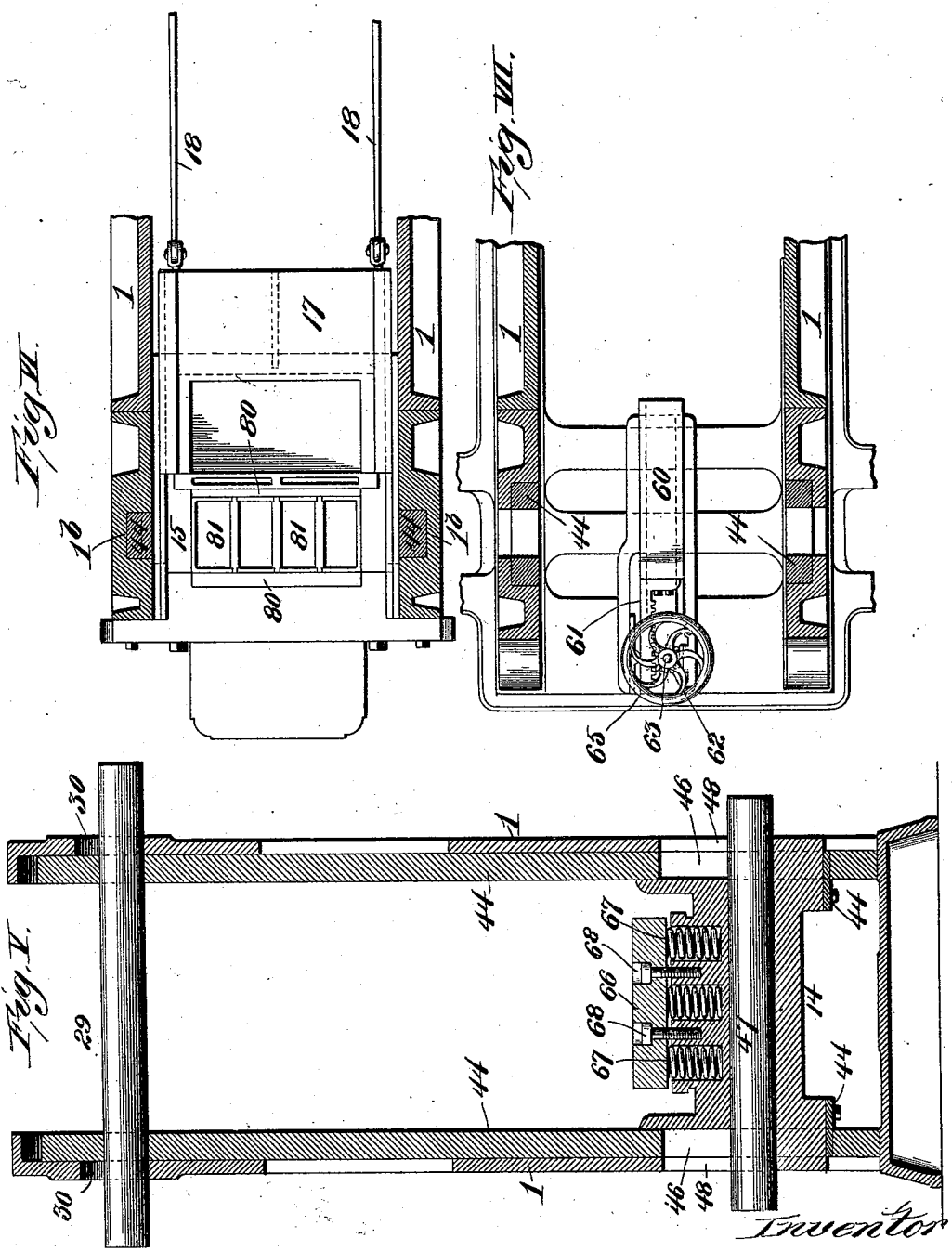
Attest
Wm H Scott
H. Finley
Inventor
Robt. N. Ross.
By Knight Bro
Attys

UNITED STATES PATENT OFFICE.

ROBERT N. ROSS, OF ST. LOUIS, MISSOURI, ASSIGNOR TO THE ROSS-KELLER BRICK MACHINE COMPANY, OF SAME PLACE.

BRICK-MACHINE.

SPECIFICATION forming part of Letters Patent No. 550,195, dated November 19, 1895.

Application filed February 7, 1895. Serial No. 537,616. (No model.)

*To all whom it may concern:*

Be it known that I, ROBERT N. ROSS, of the city of St. Louis, in the State of Missouri, have invented a certain new and useful Improvement in Brick-Machines, of which the following is a full, clear, and exact description, reference being had to the accompanying drawings, forming part of this specification.

My invention relates to certain improvements in brick-machines; and my invention consists in features of novelty hereinafter fully described, and pointed out in the claims.

Figure I is a side elevation of my improved machine. Fig. II is a front elevation. Fig. III is a vertical section, taken on line III III, Fig. II. Fig. IV is a top or plan view showing one of the cam-wheels in section. Fig. V is a vertical section showing only the frame of the machine, the links that connect the shaft or rod of the upper plunger to the shaft or rod of the lower plunger, and the crosshead of the lower plunger, the shafts or rods being shown in side view. Fig. VI is a detail section taken on line VI VI, Fig. III. Fig. VII is a detail section taken on line VII VII, Fig. I, with the lower plunger removed.

Referring to the drawings, 1 represents the frame, including the bed-plate of the machine.

2 is the main driving-shaft, provided with a belt-pulley 3 or other means for turning it, and which is journaled in boxes 4, secured to the frame of the machine.

5 represents pinions mounted on the shaft 2 and which mesh into cam-grooved gear-wheels 6, mounted on a counter-shaft 7, the shaft 7 being journaled in boxes 8, secured to the frame 1.

9 represents a lever journaled at 10 to the frame 1, and the outer end of which has projections 11 fitting in the grooves 12 of the cam-wheels 8. The shape of the grooves 12 is illustrated in Fig. III. There is a groove 12 on the inner face of each wheel 6, and the wheels are placed sufficiently far apart to allow the lever 9 to fit between them. One of the projections 11 fits in the groove 12 of one of the cam-wheels and the other projection 11 fits in the cam-groove of the other wheel. As the wheels are turned, the lever 9 is oscillated on its pivot 10.

13 represents the upper plunger or ram and 14 the lower plunger or ram.

15 represents the mold, located in a table 16, as usual.

17 represents the charger, to each side of which is connected a link 18, the links being made fast to the charger at 19. The inner ends of the links 18 are connected at 20 to levers 21, pivoted at 22 to the frame of the machine and having heels 23, provided with projections 24, that fit in cam-grooves 25 on the outer faces of the wheels 6. As the wheels revolve, they impart a backward and forward movement to the charger through means of the levers 21 and the links 18. The shape of the grooves 25 is illustrated in Fig. I, and the parts are of course so disposed that the charger will move at the proper time relatively to the movement of the plungers, so that the charger will be advanced, fill the mold, and recede before the plungers commence to move, and will remain at rest at its inner position while the plungers are pressing the brick.

26 26$^a$ represent a pair of links, forming a toggle on each side of the machine outside of the frame. These toggles are connected by arms 27 to the lever 9 by means of a rod 28. The upper ends of the upper links 26 are connected loosely to a shaft 29, fitting in elongated openings 30 in the frame of the machine. The lower ends of the links 26$^a$ are pivoted at 31 to blocks 32, resting upon wedges 33, supported upon small side frames 34, that rest upon the bed-plate of the machine.

It will be seen that as the lever 9 is operated and the toggles 26 26$^a$ moved in and out the shaft will be raised and lowered in the openings 30, and by adjusting the wedges 33 the height of the movement of the shaft 29 may be regulated. As a means for moving the wedges 33, I have shown set-screws 35. (See Figs. I and II.)

Rigidly secured to the rod or shaft 29 within the frame of the machine are arms or levers 38, the lower ends of which are pivoted to the upper plunger or ram 13 by means of an arm 39. The upper end of the arm 39 is pivoted to the links 38, as shown at 40, so that the links and arm form a toggle by which the upper plunger is raised and lowered, the plunger being guided so as to move vertically when the toggle is operated by its ends 13ª, fitting in grooves 1ª in the frame of the machine. It will be seen that as the toggle 38 39 is opened and closed the upper plunger will be raised and lowered, the vertical movement of the shaft 29 being under the control of the toggles 26 26ª, so that as the toggle 38 39 is operated the shaft 29 forms the upper bearing of this toggle. The toggle 38 39 is connected by an arm 41 to the lever 9, the arm being connected to the toggle at 40 and to the lever at 43. (See Fig. III.)

The lower plunger has pressing motion imparted to it through virtue of a connection between it and the shaft 29. This connection is made by means of straps 44, fitting in guide-grooves 1ᵇ in the frame 1. (See Figs. V and VI.) The shaft 29 passes through holes in the straps 44, as shown in Fig. V, while the lower ends of the straps have elongated openings 46, through which a lower shaft 47 passes, the shaft 47 supporting the lower plunger or ram 14. The frame 1 is also provided with slots or elongated openings 48, in which the shaft 47 fits. It will thus be seen that as the toggle 38 39 is moved to depress the upper plunger the lower plunger will be caused to ascend, for as the toggle 38 39 straightens out the toggles 26 26ª are at the same time straightening out and allowing the shaft 29 to rise, and as the shaft 29 rises it pulls upwardly on the lower plunger, owing to the connection made by the straps 44 between the shafts 29 and 47, or, more accurately speaking, between the shaft 29 and the lower plunger, through which the shaft 47 passes.

As shown in Fig. I, the straps 44 pass through grooves in the ends 13ª of the upper plunger, and to always insure a snug fit between the ends 13ª and the straps I employ wedges 49, that fit between the ends 13ª and the straps, and these wedges may be adjusted by screws 50.

As shown in Figs. I and III, the arm 41 is connected to the lever 9 at a higher point than the arm 27, and the toggle 38 39 is shorter than the toggles 26 26ª. The effect of this arrangement is to cause the plungers to approach when the toggle 38 39 is straightened out, notwithstanding the toggles 26 26ª are at the same time moving and allowing the shaft 29 to ascend under the pressure of the toggle 38 39. This arrangement provides for the approach of the plungers in the mold during the pressing of the brick, while at the same time both plungers, with the clay between them, are moving upwardly in the mold, the result being a polished brick, as the brick while being pressed is likewise being moved through the mold. After the brick has been pressed and the toggle 38 39 begins to recede or close, the lower plunger is caused to ascend to eject the bricks from the mold by means of levers 51, pivoted to the frame of the machine at 52, there being a lever on each side of the machine. The forward ends of these levers engage the ends of the shaft 47, as shown in Fig. I. The other ends of the levers are engaged by cams 53 on the shaft 7. The cams 53 come against the ends of the levers 51 just as the pressing is completed, and, as stated, cause the upward movement of the lower plunger to eject the bricks, this upward movement of the plunger being allowed by the elongated openings 46 and 48 in the links 44 and in the frame 1, respectively. While the lower plunger is held in this elevated position by the levers 51, the charger comes forward, as explained, and forces the bricks from over the mold-cavities onto the table 16 of the machine. As the bricks are moved from over the cavities of the mold, the cams 53 leave the levers 51, and the plunger drops to its lower position, allowing the fresh clay to fall from the charger into the mold-cavities.

The descent of the plunger may be regulated by a wedge 60, arranged beneath the plunger and adapted to be operated by a rack 61, engaged by a pinion 62, secured to the lower end of a shaft 63, supported in a frame 64. (See Figs. II, III, and VII.) The shaft 63 is provided with a hand-wheel 65, by which the shaft may be turned to move the wedge 60 in and out.

The die or face of the lower plunger rests upon a block 66, (see Fig. V,) the block being supported upon springs 67 set into sockets formed in the upper face of the body of the plunger. The block 66 is held to the plunger by means of screws 68 tapped into the body of the plunger and the heads of which fit in openings formed in the block 66, so as not to interfere with the limited vertical movement of the block. The die or face of the plunger thus has a slight yielding or elastic pressure against the clay.

The levers 51 are journaled to the frame of the machine through the medium of boxes 70, fitted in openings 71 of the frame, (see Fig. I,) and set-screws 72 are placed between the boxes 70, so that the boxes may be adjusted vertically to raise the pivotal points of the levers.

When it is desired to make longer bricks than the regular stock bricks, it may be done by removing the side pieces 80 of the mold (see Fig. VI) and putting in longer division-strips 81. In this case the dies or faces of the plunger would have to be substituted by longer dies or faces, so as to correspond with the increased length of the mold-cavities.

I claim as my invention—

1. In a brick machine, the combination of a pivoted lever, means for operating the lever, a plunger having toggle connection with a movable shaft, a connection between said toggle and lever, a second pair of toggles connected to said shaft, and a connection between the last mentioned toggles and said lever at a different point from where the first mentioned toggle is connected, substantially as set forth.

2. In a brick machine, the combination of a pivoted lever, means for operating the lever, a plunger having toggle connection with a movable shaft, a connection between said toggle and lever, a second pair of toggles connected to said shaft, a connection between the last mentioned toggles and said lever at a different point from where the first mentioned toggle is connected, a lower plunger, and a connection between the lower plunger and said movable shaft, substantially as set forth.

3. In a brick machine, the combination of a pivoted lever, means for operating the lever, an upper plunger having toggle connection with a movable shaft, a connection between said toggle and lever, a second pair of toggles located outside of the frame of the machine, and being fixed at one end and connected at the other end to said movable shaft, connections between the last mentioned toggles and said lever at a different point from where the first mentioned toggle is connected, a lower plunger, and straps fitting in grooves in the frame of the machine and which connect the lower plunger to said movable shaft, substantially as set forth.

4. In a brick machine, the combination of a pivoted lever, cam wheels with which one end of said lever has direct connection, an upper plunger, a toggle connecting said plunger to a movable shaft, a connection between said toggle and lever, a pair of toggles fixed at their lower ends and connected at their upper ends to said movable shaft, connections between the last mentioned toggles and said lever, a lower plunger, and connections between the lower plunger and said movable shaft, substantially as set forth.

5. In a brick machine, the combination of a pivoted lever, means for operating said lever, an upper plunger, a toggle connecting the upper plunger to a movable shaft, a connection between said toggle and lever, a pair of toggles fixed at one end and connected at the other end to said movable shaft, connections between the last mentioned toggles and said lever, a lower plunger, and connections between the lower plunger and said movable shaft, substantially as set forth.

6. In a brick machine, the combination of a pivoted lever, means for operating the lever, an upper plunger, a toggle connecting the upper plunger to a movable shaft, a connection between the toggle and said lever, a pair of toggles fixed at one end and connected at the other end to said movable shaft, connections between the last mentioned toggles and said lever, and means for adjusting the bearings of the fixed ends of said last mentioned toggles, substantially as set forth.

7. In a brick machine, the combination of a pivoted lever, cam wheels for operating said lever, an upper plunger, a toggle connecting the upper plunger to a movable shaft, a connection between said toggle and lever, a lower plunger, and straps connecting the lower plunger to said movable shaft; said straps fitting in grooves in the frame of the machine, and said upper plunger having ends fitting in openings in the frame of the machine and being grooved to receive such straps, substantially as and for the purpose set forth.

ROBERT N. ROSS.

In presence of—
GEO. H. KNIGHT,
STANLEY STONER.